Figure 1:
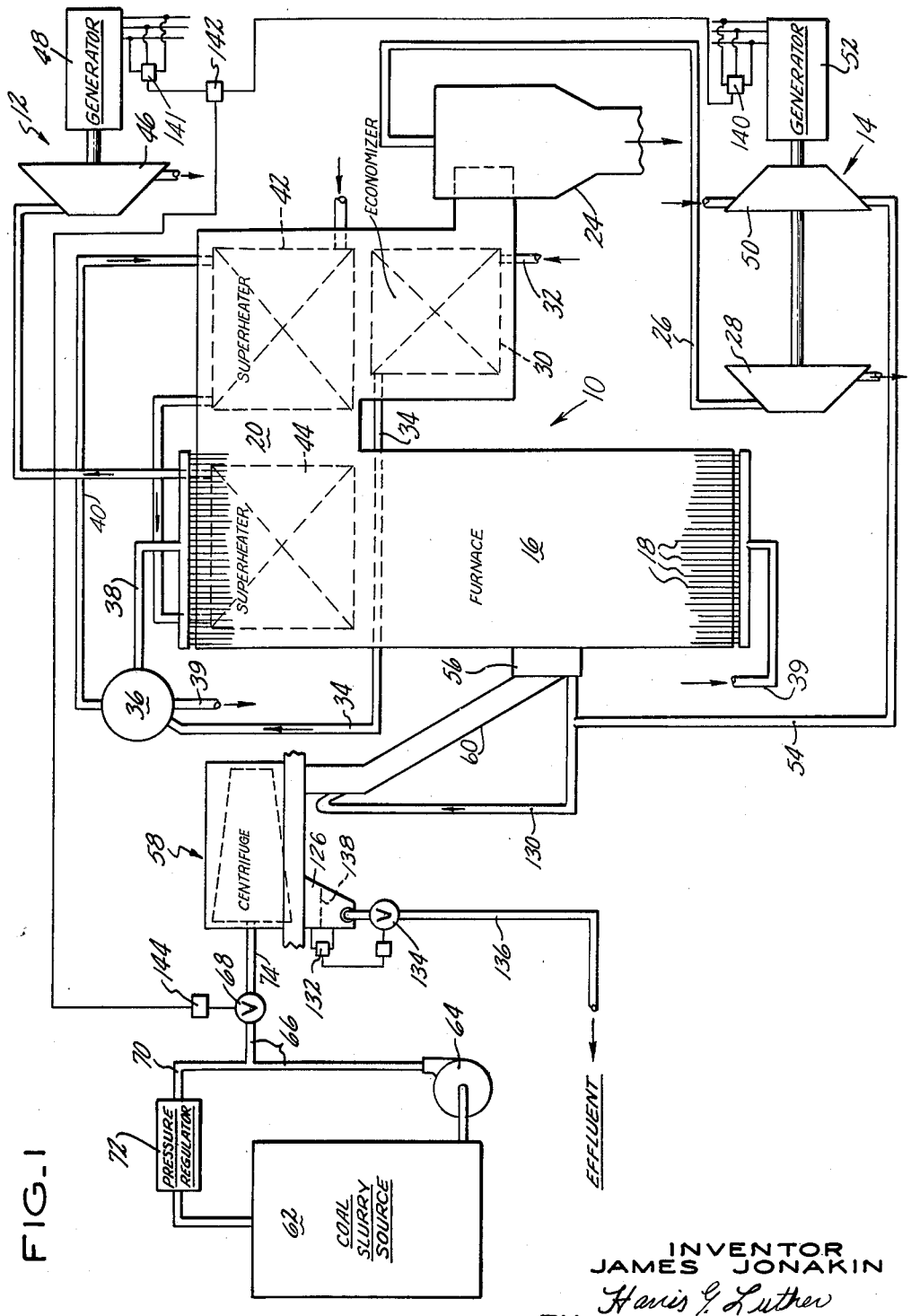

July 20, 1965  J. JONAKIN  3,195,306
GAS–STEAM POWER PLANT
Filed Dec. 17, 1962  2 Sheets-Sheet 1

INVENTOR
JAMES JONAKIN
BY *Harris G. Luther*
ATTORNEY

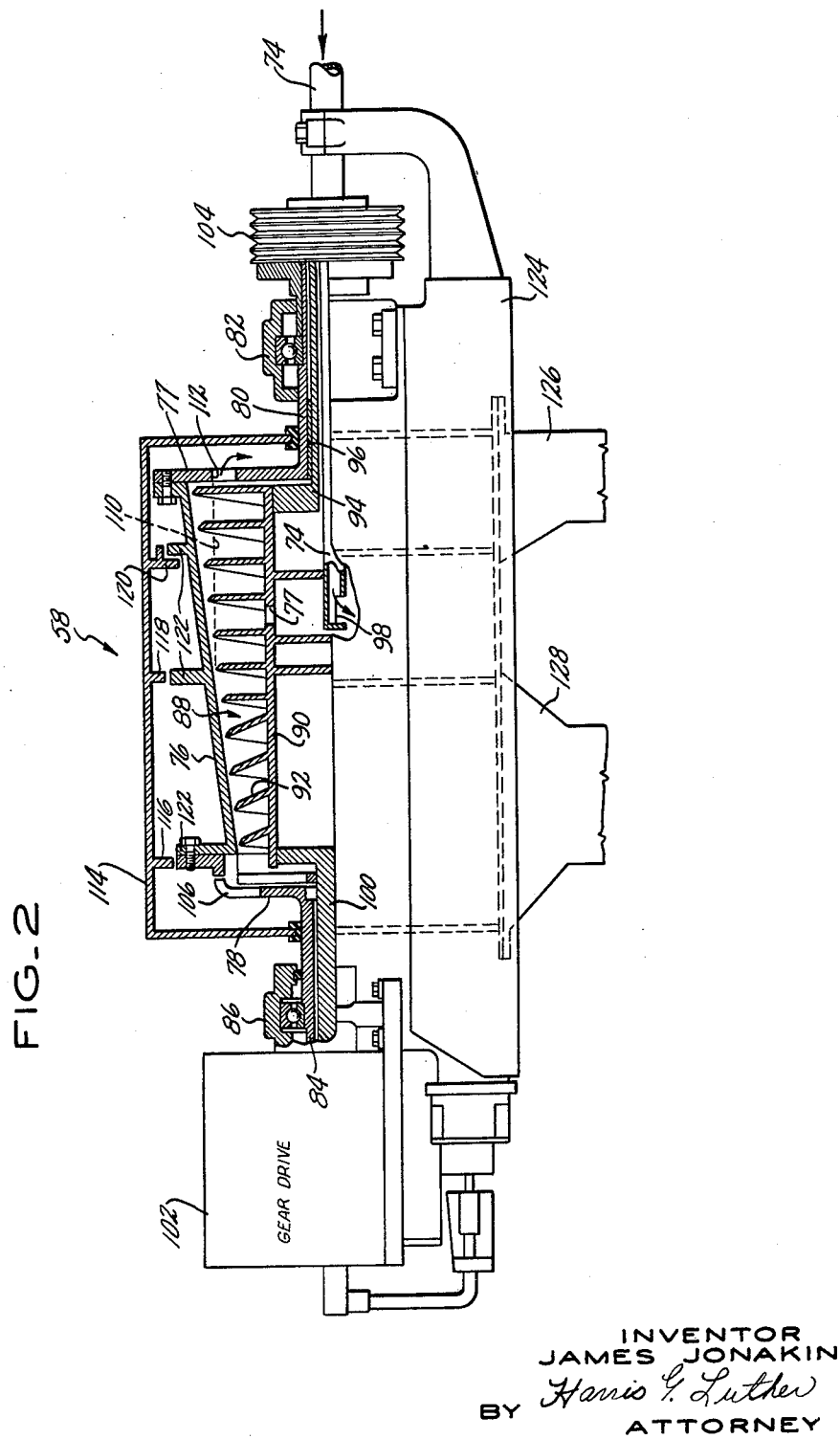

United States Patent Office 3,195,306
Patented July 20, 1965

3,195,306
GAS-STEAM POWER PLANT
James Jonakin, Simsbury, Conn., assignor to Combustion
Engineering, Inc., Windsor, Conn., a corporation of
Delaware
Filed Dec. 17, 1962, Ser. No. 245,302
7 Claims. (Cl. 60—39.18)

This invention relates generally to a gas-steam power plant and method of operation wherein a supercharged vapor generator supplies high pressure vapor to a vapor turbine or the like and a high pressure gas to a gas turbine or the like with the invention being particularly concerned with such a gas-steam power plant wherein the supercharged vapor generator is fired with comminuted coal.

With the gas-steam cycle a decrease in the heat rate of a power plant may be provided over that which can be obtained with the steam cycle alone. There are, however, attendant difficulties with the gas-steam cycle which have, to date, prevented its adoption to any significant extent in large power plant installations. One of these difficulties concerns the supplying of comminuted coal to the supercharged or high pressure furnace of such a power plant installation, with coal being the most commonly employed fuel in large power plant installations today. Various attempts and methods have been tried to supply the high pressure burning zone of such a power plant installation with comminuted coal including the so-called lock-hopper system and also forming a coal slurry and pumping this into the high pressure burning zone. However, each of these prior art systems have one or more features that makes it undesirable, such as being unduly complex or causing an undue loss in efficiency. With the present invention, former difficulties are overcome or greatly reduced and there is provided a power plant operating on the gas-steam cycle wherein a continuous supply of comminuted coal is provided to the high pressure furnace or burning zone. This continuous supply of comminuted coal is obtained through a pressurized firing system that includes a centrifuge, the concentrate outlet or discharge of which is connected directly to the furnace of the vapor generator through suitable duct work and the burner organization which forms a part of the furnace. The centrifuge therefore operates with an internal pressure substantially the same as that of the furnace. A slurry of the comminuted coal is formed such that it may be pumped and this slurry is pumped at a regulated rate into the centrifuge, where a substantial portion of the water is removed from the slurry with the dewatered coal being supplied to the furnace. Since the dewatered coal is conveyed directly from the centrifuge to the furnace the regulation of the fuel supply to the furnace is obtained by regulating the supply of slurry to the centrifuge.

It is accordingly an object of the present invention to provide an improved method and power plant utilizing the gas-vapor cycle and wherein the furnace of the vapor generator is fired by comminuted coal.

A further object of the invention is to provide such an improved method and power plant system wherein the organization for supplying comminuted coal to the furnace of the vapor generator is relatively simple and yet highly efficient in operation.

A still further object of the invention is the provision of such an improved method and power plant wherein the comminuted coal is supplied to the high pressure furnace thereof by being pumped in a slurry to a centrifuge where the coal is dewatered with the dewatered coal then being conveyed through a pressurized system into the furnace.

Other objects and advantages will be apparent from the following specification and the attached drawing in which:

FIGURE 1 is a diagrammatic representation of a power plant system employing the present invention; and FIGURE 2 is a fragmentary sectional view of the liquid-solid, or so-called solid bowl, centrifuge which forms a part of the invention.

The power plant of the present invention includes the high pressure vapor generator 10 which is operative to supply high pressure vapor to the turbo-generator unit 12 and high pressure gas to the turbine-compressor-generator unit 14. The vapor generator 10 includes furnace 16 which is supercharged, preferably operating at a pressure of about 95 or 100 lbs. per sq. inch, with the walls of the furnace being lined with heat exchange tubes 18, which may be steam generating tubes. High pressure gases generated from the burning of comminuted coal pass upwardly through the furnace 16 and thence laterally through the lateral gas pass 20 and downwardly through the vertically extending gas pass 22. These high pressure gases are then introduced into the separator 24 wherein any foreign matter, such as ash, is separated therefrom with the clean gases being conveyed from the separator and through duct 26 to the gas turbine 28 of unit 14.

Feedwater supplied to the vapor generator 10 is first preheated by means of the economizer 30 positioned in gas pass 22 with the feedwater being supplied to the economizer through the inlet 32 and discharged from the economizer through the conduit 34 which is connected with the steam and water drum 36. Water is conveyed from the drum 36 through downcomer 39 to the lower ends of tubes 18 and in passing up through these tubes a portion of this water is vaporized with the vapor and water mixture thus produced being conveyed through conduit 38 into the vapor and water drum 36. Saturated vapor is taken from this drum to conduit 40 and it is serially conveyed through the low temperature superheater 42 and then the high temperature superheater 44 where it is finally superheated to its desired value and introduced into the turbine 46. The exhaust from this turbine, as is conventional, is conveyed to a suitable condenser and thereafter returned by the feed pump to the vapor generator.

The vapor turbine 46 drives the electric generator 48 while the gas turbine 28 drives the compressor 50 and the electric generator 52. The compressor 50 is effective to provide high pressure combustion supporting air which is introduced into the furnace through duct 54.

The furnace may be fired in any desired manner with the burner arrangement being only diagrammatically illustrated and identified as 56. There are a number of well known firing techniques presently employed in the burning of comminuted coal, and any one of these may be employed, for instance, the front or opposed wall firing arrangement may be utilized wherein a burner organization such as that disclosed in U.S. Patent 2,512,196, issued June 20, 1950, may be used or the tangential firing technique may be employed such as disclosed in U.S. Patent 2,575,885, issued November 20, 1951, or cyclone type of firing may be employed such as disclosed in U.S. Patent 2,357,301, issued September 5, 1944. In these as well as other well known firing techniques, the coal is crushed or pulverized to a suitable size for the particular type of firing and is burned in the burning zone of the vapor generator in the presence of combustion supporting air.

In firing the supercharged vapor generator 10 it is necessary that the comminuted coal that is introduced into the firing zone of the vapor generator be contained or disposed within an atmosphere which is at a pressure that corresponds generally with the high pressure prevailing in the burner zone. It is desired that the comminuted coal as introduced into the firing zone or furnace be in a relatively dry condition and, of course, it is necessary to regulate the fuel supply to the power plant in order to meet the demand that is imposed upon the power plant. These objectives are accomplished with the present invention by utilizing a pressurized fuel supply or feeding system which includes a liquid-solid centrifuge 58 which has its outlet for concentrate connected with the burner 56 through the duct 60. The centrifuge is thus open to the furnace 16 through the duct 60 and burner 56 so that the pressure within these elements of the fuel supply system is generally the same as that within the furnace 16.

A slurry of comminuted coal and water which is of such proportions as to be pumpable, such as 60% coal and 40% water, is forced into the centrifuge 58 under suitable pressure to overcome the relatively high pressure existing therein. In the system disclosed the slurry is pumped from the source, i.e., containment vessel 62, by means of pump 64 and discharged into the centrifuge through conduit 66 within which is connected the regulating valve 68. The pressure of the slurry upstream of the valve 68 is maintained at a generally constant value in order that delivery of the slurry to the centrifuge 58 may be relatively accurately controlled by the valve 68 and in order to provide this generally constant supply pressure there is provided a bypass 70 which contains a suitable pressure regulator or the like 72, with this bypass leading to the container 62.

The coal slurry that is introduced into the centrifuge 58 necessarily has a relatively large percentage of water in order that it may be pumped through a conduit or pipe line. In preparing a slurry the coal is crushed or pulverized to the desired fineness for the firing system that is employed with the particular supercharged vapor generator. Upon being introduced into the centrifuge 58 the slurry has a substantial portion of the water removed through the separating action of the liquid-solid centrifuge, known as a solid bowl centrifuge, with the concentrate or dewatered comminuted coal that is discharged from the centrifuge outlet having a water concentration of less than 20% and preferably between 15-20%, with a concentration of 13% having been achieved.

The pumpable coal slurry enters the interior of the centrifuge 58 through the inlet pipe 74, FIG. 2, and within the centrifuge a separation of the solids from the liquid is effected by sedimentary action with the solids being retained against the wall of the rotating bowl of the centrifuge while the liquid is drained from the bowl. The centrifuge thus comprises rotating bowl 76 which includes at one end a head 77 and at the other a head 78 with the head 77 having a cylindrical extension 80 that is received and supported in bearing 82 while head 78 has a cylindrical extension 84 that is supported and received in bearing 86. Accordingly, the bowl rotates about its horizontal axis and within the bearings 82 and 86. Mounted within the bowl is the screw conveyor identified generally as 88 and which includes the hub 90 about which is mounted helical screw 92. Extending from the right end of the hub 90, as viewed in FIG. 2, is the hollow shaft 94 with the shaft being journaled via bearing 96 within the cylindrical extension 80 of the hub 77. The inlet conduit 74 is received within this hollow shaft 94 being journaled to this shaft in a fluid tight and pressure resistant manner, and with the slurry being discharged through the opening 98 provided at the inner end of the inlet pipe 74. From the other end of hub 90 there extends shaft 100 which is connected with the gear drive identified generally as 102. The gear drive is also connected with the rotating bowl 76 by means of the cylindrical extension 84 provided on the head 78. The bowl is rotated through a suitable drive, such as through sheaves 104 that may be connected via suitable belts to a driving motor, and by rotating the bowl, the screw conveyor assembly is rotated through the gear drive 102. This gear drive mechanism is such that the conveyor is rotated at a speed that varies by some 10 or 30 r.p.m. from that of the bowl with the direction of rotation of the screw conveyor with relation to the bowl being such that the helical screw conveys the concentrated solids within the bowl axially therealong to the solid discharge outlets 106 provided in the head 78 at the end of the bowl with there being a plurality of such openings circumferentially spaced.

In operation, the screw conveyor and the bowl rotate about the horizontal axis of the centrifuge at a relatively high speed as for example 1,000-2,000 r.p.m. with the slurry that is discharged into the center of hub 90 through the opening 98 in the inlet pipe 74 being thrown outwardly through the ports 77 provided in the hub and into the area between the hub and the bowl. The solids are thrown and retained against the inner surface of the bowl, and the screw conveyor moves the solids along the bowl toward the outlets 106. The liquid forms a pool designated 110, and there is provided in the head 77 one or more outlets 112 for this filtrate.

The rotating bowl and its associated elements are mounted within casing 114 within which are provided baffles 116, 118 and 120 which cooperate with the annular rings 122 formed on bowl 76 so as to provide a restriction or labyrinth which is for the purpose of preventing the intermixing of the concentrate and the filtrate after they have been separated and discharged from the rotating bowl. The casing 114 is mounted upon a fixed frame 124 and is suitably journaled to the extensions from the two heads of the bowl in a manner to provide a generally fluid tight and pressure resistant enclosure with the filtrate or liquid discharge 126 being provided on the casing 114 and extending from this enclosure while the concentrate or dewatered solids outlet or discharge 128 extends therefrom at the opposite end of the casing. The concentrate outlet 128 is connected with the upper end of the duct 60 in a fluid tight manner so that the dewatered comminuted coal continuously passes from the centrifuge outlet through the conduit 60 to the burner 56 and then into the burning zone or furnace of the vapor generator. The centrifuge is preferably mounted at an elevation above the burning zone in the furnace so that conveyance of the dewatered coal from the centrifuge to the burner and into the furnace is aided by means of gravity descent. Also aiding in the conveyance of the coal down through the duct 60 is a stream of air which is admitted to the upper end of the duct in a downwardly inclined direction by means of the branch conduit 130 connected with the high pressure air supply duct 54.

The solid bowl centrifuge 58 is of pressure tight construction having suitable seals between the relatively rotating portions thereof where necessary in order to seal against the high pressure that prevails within the centrifuge and prevents escape thereof to the atmosphere with the pressure in the centrifuge and that in the duct 60 being generally the same as that in the combustion zone, such as 95 lbs./sq. inch or better as previously mentioned. In order to prevent a substantial loss of pressure as a result of the discharge of the filtrate from the centrifuge a liquid level control device is utilized, with this device, identified as 132, controlling valve 134 in the discharge conduit 136 that extends from the discharge compartment of the centrifuge, thereby maintaining a desired level such as 138 in this compartment.

With this system for supplying comminuted coal to the burning zone of the supercharged vapor generator a relatively simple scheme is provided for introducing comminuted coal in a relatively dry condition into the high pressure firing zone of the vapor generator and at the same time a simple regulation of the rate of coal supply to the supercharged vapor generator is provided. The removal of a substantial portion of the moisture from the pumpable coal slurry prior to introducing the comminuted coal into the furnace is extremely desirable from an efficiency standpoint since the heat required to vaporize the moisture contained in this comminuted coal as it is introduced into the burning zone represents a loss insofar as the heat of vaporization is concerned since this vaporized moisture passes to the exhaust or the stack in the vapor state. However, in order to have satisfactory operation it is necessary that a continuous supply of coal be provided to the burning zone and the centrifuge lends itself ideally to this fuel supply system since with this device it is possible to continuously extract a substantial portion of the water from the coal slurry and provide a continuous supply of dewatered comminuted coal to the high pressure burning zone of the vapor generator. The residence time of the comminuted coal in the centrifuge is only a few seconds, i.e., it only takes a few seconds for the coal that is discharged into the centrifuge through the inlet pipe 74 to pass through this device and discharge through the concentrate outlet 128. Accordingly, by regulating the rate of slurry supply to the centrifuge the rate of firing of the vapor generator may be accurately controlled. It is desired that the rate of firing or the rate at which fuel is supplied to the vapor generator be regulated in accordance with the demand on the power plant system and for this purpose the control devices 140 and 141 may be provided which respond to this demand and which in turn, through controller 142, regulate the valve 63 through the drive 144, thereby regulating the supply of slurry to the centrifuge and accordingly the supply of fuel to the vapor generator.

It is to be understood that the invention is not limited to the specific embodiment herein illustrated and described, but may be used in other ways without departing from its spirit and that various changes can be made which would come within the scope of the invention which is limited only by the appended claims.

I claim:

1. A gas-steam power plant system comprising a supercharged vapor generator having a furnace, a vapor operated prime mover means receiving vapor from the generator, gas operated prime mover means receiving high pressure gas from the generator, compressor means operated by one of said prime mover means to supply high pressure combustion supporting air to the furnace, a pressurized system operating at generally the same high pressure existing in the furnace operative to provide a continuous supply of comminuted coal to said furnace for burning therein and including a solid bowl centrifuge for dewatering a coal slurry and means conveying dewatered coal directly from the centrifuge and introducing it into the furnace, a source of a pumpable coal slurry and means including pump means operative to regulatingly supply slurry from the source directly to the centrifuge with the regulation of this supply regulating the supply of coal to the furnace.

2. The power plant of claim 1 wherein the means to regulatingly supply slurry from the source directly to the centrifuge includes regulating means downstream of the pump operative to regulate the flow into the centrifuge, by-pass means intermediate the pump and the regulating means leading back to the source and pressure regulating means in said by-pass.

3. The power system of claim 1 wherein the centrifuge is positioned above the location of the coal introduction into the furnace with conduit means extending down therefrom to such location.

4. In a power plant system the combination of a steam turbine and a gas turbine served by a supercharged coal fired steam generator, compressor means operated by the gas turbine and introducing combustion supporting air into the furnace of the generator producing a pressure therein of at least about 95 lbs./in.², a system for continuously supplying comminuted coal to said furnace for burning therein including a solid bowl centrifuge operating generally at the furnace pressure, means conveying the solids discharged from the centrifuge directly to the furnace so that the rate of supply to the furnace varies in accordance with the supply to the centrifuge, a source of a pumpable slurry of comminuted coal and water and means for introducing into the centrifuge slurry directly from said source including means regulating such introduction to thereby regulate the coal supply to the furnace.

5. The power plant system of claim 4 wherein the centrifuge is above the location of coal introduction into the furnace with coal conveying conduit means extending down therefrom to such location and means supplying air from the compressor to the upper region of said conduit for assisting conveying coal there along into the furnace.

6. A gas-steam power plant comprising a supercharged steam generator combined with a steam turbine and a gas turbine, a compressor driven by the gas turbine, the generator having a supercharged furnace fired with comminuted coal with the compressor supplying high pressure combustion supporting air thereto, firing means comprising burner means, a solid bowl centrifuge and conduit means conveying the centrifuge concentrate directly from the centrifuge to the burner so that the furnace is fired therewith at the rate of discharge from the centrifuge, said centrifuge, conduit means and burner means forming a continuous passage open to the furnace and operating at the high pressure prevailing in the furnace, and means operative to introduce a pumpable slurry of coal and water directly into the centrifuge including regulating means effectively responsive to the demand on the power plant operative to regulate the rate of such introduction in accordance with said demand.

7. The method comprising creating a high pressure stream of combustion gases by introducing combustion supporting air and comminuted coal into a burning zone at high pressure and burning said coal therein, imparting a portion of the thus developed heat to a vaporizable fluid thereby vaporizing the same, converting a portion of the energy in said vapor and in said stream of combustion gases to mechanical energy and utilizing some of this energy to create a high pressure source of combustion supporting air, providing a confined zone communicating directly with the burning zone such that it has a pressure generally the same as that of said burning zone, pumping directly into said confined zone a stream of a slurry of comminuted coal and water and thereat centrifuging said slurry thereby effecting a separation of the water from the coal in said slurry and producing a continuous discharge of dewatered coal with the residence time of the comminuted coal in this zone being only a few seconds, discharging the separated water from said zone, conveying the coal discharge through a pressurized atmosphere directly to said burning zone as the source of comminuted coal, and regulating the rate of coal supply to this zone by regulating the rate of slurry introduction to the confined zone.

References Cited by the Examiner

UNITED STATES PATENTS

| 2,560,807 | 7/51 | Lobo | 60—39.46 |
| 2,679,974 | 6/54 | Gooch | 233—7 |
| 2,735,265 | 2/56 | Eastman | 60—39.46 |
| 2,777,288 | 1/57 | Glinka | 60—39.46 |
| 2,805,896 | 9/57 | Yellott | 60—39.46 |
| 2,823,126 | 2/58 | Little | 233—7 |
| 3,002,347 | 10/61 | Sprague | 60—39.18 |

FOREIGN PATENTS 747,561    4/56    Great Britain.

SAMUEL LEVINE, *Primary Examiner.*

ABRAM BLUM, *Examiner.*